United States Patent

Hikuma et al.

[11] Patent Number: 5,893,034
[45] Date of Patent: Apr. 6, 1999

[54] CORDLESS PARENT/SLAVE TELEPHONE SET WITH IMPROVED SIDETONE HANDLING

[75] Inventors: Hideo Hikuma; Kiyoshi Tanaka, both of Chiba; Koichi Tomono, Sakura, all of Japan

[73] Assignee: Uniden Corporation, Chiba, Japan

[21] Appl. No.: 906,938

[22] Filed: Aug. 6, 1997

Related U.S. Application Data

[63] Continuation of Ser. No. 352,653, Dec. 9, 1994, abandoned.

[51] Int. Cl.$^6$ .............................. H04Q 7/20; H04Q 7/34
[52] U.S. Cl. ........................... 455/501; 455/500; 455/63; 455/67.3; 455/570
[58] Field of Search ..................... 455/410, 553, 455/166, 566, 501, 63, 67.3, 570, 500; 370/62, 30; 348/15; 379/162, 202, 91, 391, 406, 410, 402, 413

[56] References Cited

U.S. PATENT DOCUMENTS

| | | | |
|---|---|---|---|
| 4,685,099 | 8/1987 | White et al. .............................. | 370/30 |
| 4,776,001 | 10/1988 | Murata et al. ............................. | 379/62 |
| 4,856,083 | 8/1989 | Makino .................................... | 455/166 |
| 5,263,079 | 11/1993 | Umemoto ................................. | 455/553 |
| 5,381,475 | 1/1995 | Cavallo ................................... | 379/406 |
| 5,420,860 | 5/1995 | Stevens et al. ........................... | 370/62 |
| 5,444,477 | 8/1995 | Yamadera et al. ......................... | 348/15 |
| 5,485,504 | 1/1996 | Ohnsorge ................................ | 455/566 |
| 5,553,137 | 9/1996 | Nyhart et al. ............................ | 379/406 |

FOREIGN PATENT DOCUMENTS

| | | |
|---|---|---|
| 3-196719 | 8/1991 | Japan . |
| 5-41681 | 2/1992 | Japan . |
| 4-323938 | 11/1992 | Japan . |
| 4-326647 | 11/1992 | Japan . |

*Primary Examiner*—Wellington Chin
*Assistant Examiner*—Keith Ferguson
*Attorney, Agent, or Firm*—McDermott, Will & Emery

[57] ABSTRACT

A parent telephone set comprises a transformer, a sidetone level reducing circuit, and a first secret talk processing circuit for executing digital secret talk processing, a counterpart slave telephone set comprises a second secret talk processing circuit for executing digital secret talk processing, a delaying circuit for delaying an aural signal from the slave telephone set microphone by a specified delay time, and a level reducing circuit for reducing the level of output from the second secret talk processing circuit according to the output from the delaying circuit. The specified delay time in the delaying circuit is set according to the time required for digital secret talk processing in the first secret talk processing circuit as well as in the second secret talk processing circuit.

12 Claims, 5 Drawing Sheets

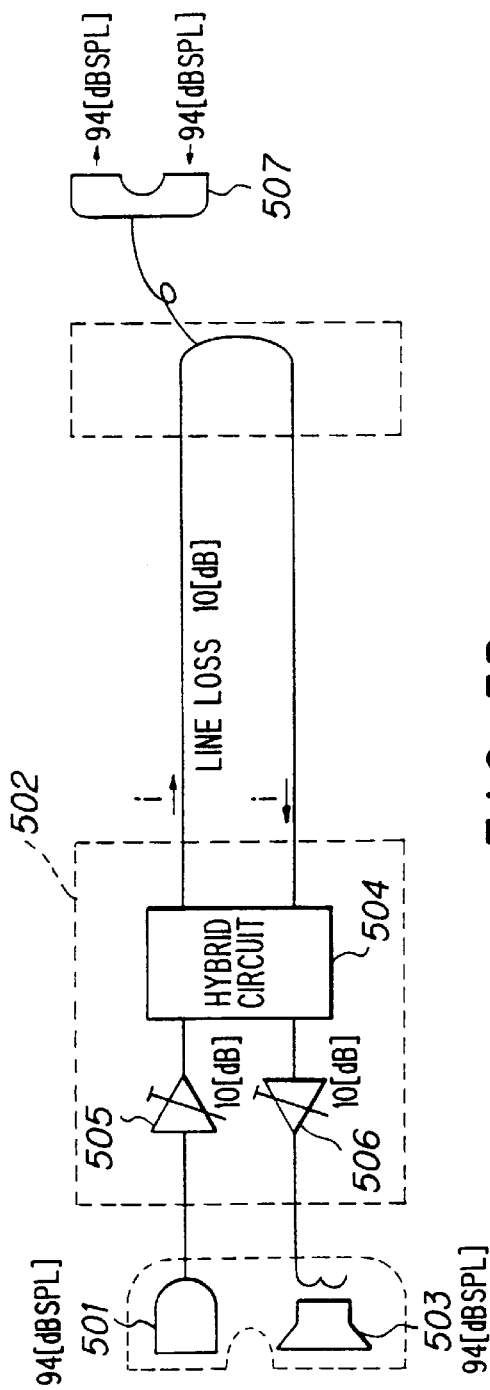
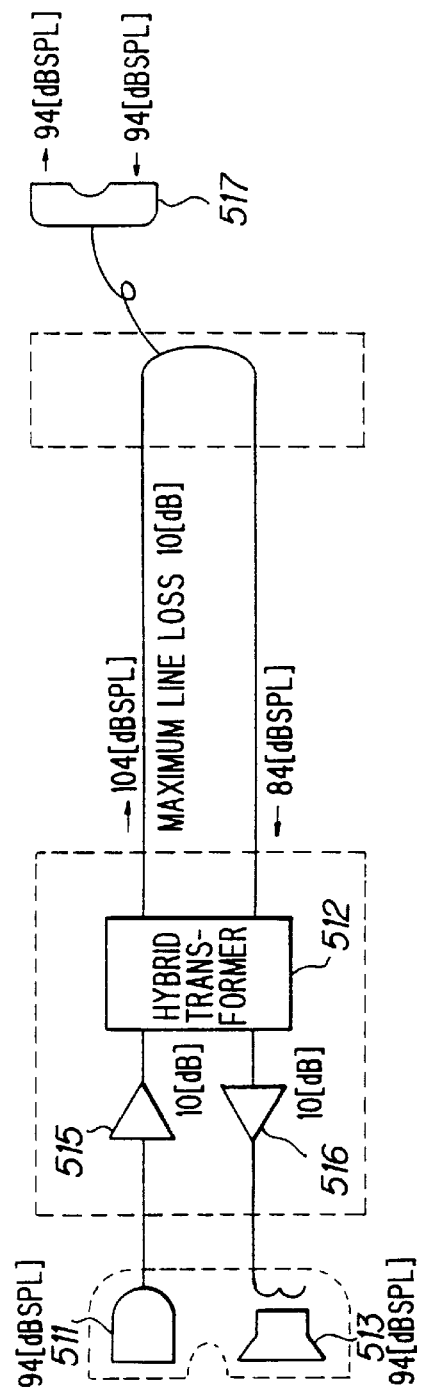
FIG. 5A (PRIOR ART)
FIG. 5B (PRIOR ART)

CORDLESS PARENT/SLAVE TELEPHONE SET WITH IMPROVED SIDETONE HANDLING

This application is a continuation of application Ser. No. 08/352,653 filed Dec. 9, 1994, now abandoned.

This patent application is the subject of a submission under the Disclosure Document Program, which was filed thereunder by applicants on Jul. 7, 1994 and identified as Disclosure Document No. 357468 with its accompanying fee paid under the provisions of all the Rules and Regulations including 37 CFR § 1.21 (c).

FIELD OF THE INVENTION

The present invention relates to a radio transmitter/receiver such as a digital cordless telephone set, and more particularly to a radio transmitter/receiver employing a transformer system having a telephone set which can reduce a sidetone level and respond to various types of line or a line of various lengths.

BACKGROUND OF THE INVENTION

FIG. 3 is a block diagram of a conventional type of cordless telephone set (a first example of conventional technology). This example of conventional technology was disclosed in Japanese Patent Laid-Open Publication No. 326647/1992. In this figure, the reference numeral 301 indicates a parent telephone set, while the reference numeral 302 indicates a slave telephone set. The parent telephone set 301 has basically the same configuration as that of the slave telephone set 302, and brief description is made below for the basic configuration of the parent telephone set 301. The parent telephone set 301 is provided with a speech network IC 314, and connected to the speech network IC 314 is a telephone line LINE, and also connected thereto is a receiver 316 having a parent telephone set microphone as well as a parent telephone set speaker.

Also in the speech network IC 314 is incorporated a sidetone generator to generate a so-called sidetone, and when setting a call using the receiver 316 in the parent telephone set 301, a caller can hear a portion of voice taken from a parent telephone set microphone as sidetone, so that harmonious call is possible.

Also connected to the speech network IC 314 is a secret talk processing circuit 313. Specifically, the secret talk processing circuit 313 is provided with a secret talk processing section and a secret talk reproducing section, both of which include an A/D convertor and a D/A convertor respectively and execute a digital secret talk processing such as, for instance, interleave.

In addition to the basic configuration as described above, in this example of conventional technology, the parent telephone set 301 has a sidetone canceling circuit 315, while the slave telephone set 302 has a sidetone generating circuit 324. This configuration is employed because sidetone in the slave telephone set is generated by a sidetone generator provided in the speech network IC 314 of the parent telephone set 301, and for this reason a large delay time is generated in a secret talk processing circuit existing in a path from the slave telephone set 302 to the parent telephone set 301 as well as in a path from the parent telephone set 301 to the slave telephone set 302. Hence, a person using the slave telephone set 302 monitors the person's own voice delayed by the delay time described above, causing a serious disturbance because of echo.

Namely the sidetone generating circuit 324 in the slave telephone set 302 outputs a portion of aural signal, obtained through a microphone of the slave telephone set as a sidetone, to a speaker of the slave telephone set, while a sidetone canceling circuit 315 in the parent telephone set 301 deletes the slave telephone set sidetone generated in the sidetone generating circuit 324. With this feature, delay because of digital secret talk is eliminated, and a talker using the slave telephone set 302 can monitor the talker's own voice without experiencing echo disturbance.

A telephone set employing therein a speech network IC in a speaker circuit is called "a telephone set based on a speech network IC system". In contrast to it, a telephone set using a transformer circuit such as a hybrid transformer in the speaker circuit is called "a telephone set based on a transformer system".

FIG. 4 is a block diagram of a parent telephone set in a conventional type of digital cordless telephone using the transformer system (second example of conventional technology). The parent telephone set in this example of conventional technology is provided with a phase shifter 404 and a mixer 402, each as a sidetone level reducing means, in addition to a secret talk processing circuit 123 and a hybrid transformer 121. This sidetone level reducing means combines, by the mixer 402, an aural signal for calling subjected to phase inversion in the phase shifter 404 with that returning as a sidetone from the telephone line section to cancel the sidetone.

Next, description is made for problems in the transformer system (second example of conventional technology), taking into consideration the first and second examples of conventional technology described above. At first, FIG. 5A is a block diagram illustrating a case where a telephone set (a parent telephone set) based on the speech network IC system is connected to a telephone line. A speech network 502 in this figure is, for instance, TEA 1067, and has a resistance bridge type of sidetone canceling circuit, an AGC (Automatic Gain Control) circuit, and an amplifier to compensate degradation of the receiving characteristics.

In this case, the AGC circuit in the speech network IC 502 detects a current i flowing in the line and controls a gain in amplifiers 505, 506 of the telephone set. The line loss varies according to type of line and line length, but with this configuration, a telephone set which can respond to various types of line can be realized.

FIG. 5B is a block diagram illustrating a case where a telephone set (a parent telephone set) based on the transformer system is connected to a telephone line. Unlike the AGC circuit in the speech network IC 502, the hybrid transformer 512 does not have a means for controlling gains in the amplifiers 515 and 516 in the telephone set by detecting the current i flowing in the line. For instance, assuming that a standard sound is 94 dBSPL and a line loss is 10 dBSPL, a gain of 10 dB is required for the microphone amplifier 515 and the speaker amplifier 516 respectively.

Line loss varies according to line type and line length, but, for instance, in a case where a telephone set having the configuration as shown in FIG. 5B is applied to a local exchange having a low line loss or the like, a transmitting level and a receiving level in a telephone set (a parent telephone set) become high, and naturally the level of sidetone returning through the parent telephone set to be heard by a talker using the slave telephone set also becomes higher, which causes some problems in hearing through the slave telephone set. Also, even if the configuration in the first example of conventional technology (as disclosed in Japanese Patent Laid Open Publication No. 326647/1992) is applied, gains of the amplifiers 515 and 516 in the telephone set remain relatively large, so that it is impossible to lower the level of sidetone.

As described above, in the conventional type of radio transmitter/receiver, especially based on the transformer system, gain control for an amplifier according to a current flowing in a line is not executed, so that level of sidetone can not be reduced, and also a telephone set which can respond to various line types and different line lengths can not be realized.

SUMMARY OF THE INVENTION

It is an object of the present invention to provide a radio transmitter/receiver which can respond to various line types as well as to different line lengths.

In the radio transmitter/receiver according to an embodiment of the present invention, a level of sidetone, transferred from the line through a transformer to a parent telephone set, is reduced by a sidetone level reducing circuit. In the slave telephone set, an aural signal is delayed by a delaying circuit by a specified period of time set according to a time required for digital secret talk processing in a first secret talk processing circuit 123 as well as in a second secret talk processing circuit, and an output level from the second secret talk processing circuit is reduced by the level reducing circuit at a timing according to output from the delaying circuit.

Thus a level of sidetone accompanying delay caused by digital secret talk processing in the second secret talk processing circuit of the slave telephone set as well as in the first secret talk circuit of the parent telephone set, in other words, the level of sidetone returning through the parent telephone set, is reduced at a time when the sidetone reaches the slave telephone set speaker. The level of the sidetone is reduced by a constant rate without being affected by line loss or by line impedance, so that it is possible to realize a radio transmitter/receiver having a telephone set without accompanying echo disturbance, even when based on the transformer system which can respond to various line types and different line lengths.

In the radio transmitter/receiver according to the present invention, in the slave telephone set, an aural signal from the slave telephone set microphone is delayed by the delaying circuit by a specified period of time set according to a time required for digital secret talk processing of the aural signal, and an output level from the secret talk processing circuit is reduced by the level reducing circuit at a time according to the output from the delaying circuit.

Thus a level of sidetone accompanying a delay by digital secret talk processing for an aural signal, namely, sidetone returning through the parent telephone set, is reduced at a time when the sidetone reaches the slave telephone set speaker. The level of sidetone is reduced at a constant rate without being affected by line loss or by line impedance, so that it is possible to realize a radio transmitter/receiver having a telephone set without accompanying echo disturbance, even when based on the transformer system which can respond to various line types and different line lengths.

In the radio transmitter/receiver according to the present invention, a signal having a specified voltage level is outputted by the delaying circuit when the voltage level of an aural signal from the slave telephone set microphone is amplified by an operational amplifier to a specified reference voltage level (Vref), and output from the operational amplifier is delayed by a detector by a specified period of time.

Thus, by setting the specified reference voltage level (Vref) according to the level of a talker's voice, and also by setting a delay time of the delaying circuit to an appropriate value, necessary measures can be taken for sidetone accompanying a delay time by digital secret talk processing.

Also in the radio transmitter/receiver according to the present invention, the level reducing circuit is realized by a switching circuit such as a transistor element, and connection between the output of the second secret talk processing or the secret talk processing circuit and ground voltage (GND) is turned ON/OFF according to the output from the delaying circuit, so that a speaker circuit can be realized as an integrated circuit, which in turn makes it possible to minimize circuit size, and consequently the size of the radio transmitter/receiver.

In the radio transmitter/receiver according to the present invention, in the slave telephone set, an aural signal from the slave telephone set microphone is transferred through the sidetone transfer circuit to the slave telephone set speaker so that a talker using the slave telephone set can hear the talker's own sidetone. With this feature, a talker can hear a portion of voice taken in from the slave telephone set microphone as a sidetone from the slave telephone set speaker, and thus talk without any echo disturbance.

Furthermore, in the radio transmitter/receiver according to the present invention, the sidetone level reducing circuit comprises a phase shifter and a mixer, output from the first secret talk processing circuit, is subjected to phase inversion in the phase shifter, output from the phase shifter, is combined by the mixer with the output from the transformer, and the combined output is supplied to the first secret talk processing circuit to cancel the sidetone. With this feature, also a talker using the parent telephone set 120 can talk over the telephone line without experiencing any echo disturbance.

Other objects and features of this invention will become understood from the following description with reference to the accompanying drawings.

BRIEF DESCRIPTION OF THE DRAWINGS

FIG. 5A is a block diagram for describing a case where a telephone set based on the speech network IC system is connected to a telephone line; and FIG. 5B is a block diagram fir describing a case where a telephone set based on the transformer system is connected to a telephone line.

DETAILED DESCRIPTION OF THE EMBODIMENT

Figure 1:
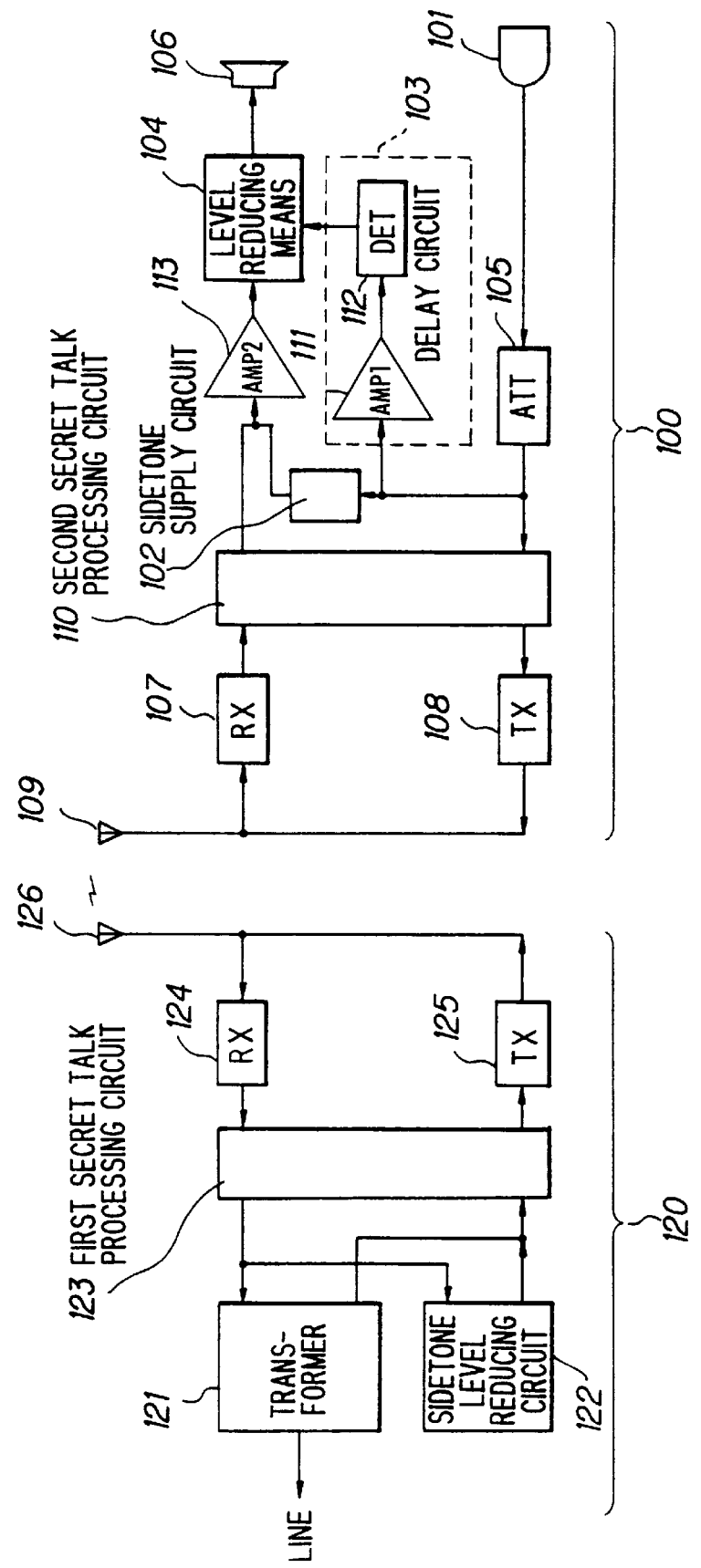
FIG. 1 is a general block diagram of a parent telephone set and a slave telephone set in a radio transmitter/receiver according to an embodiment of the present invention.

Detailed description is made for an embodiment of the radio transmitter/receiver according to the present invention with reference to the related drawings. FIG. 1 is a general block diagram of a parent telephone set and a slave telephone set in a radio transmitter/receiver according to an embodiment of the present invention.

In the figure, a parent telephone set 120 in the radio transmitter/receiver according to the present embodiment comprises, as main components, transformer 121, sidetone level reducing circuit 122, and first secret talk processing circuit 123.

Figure 4:
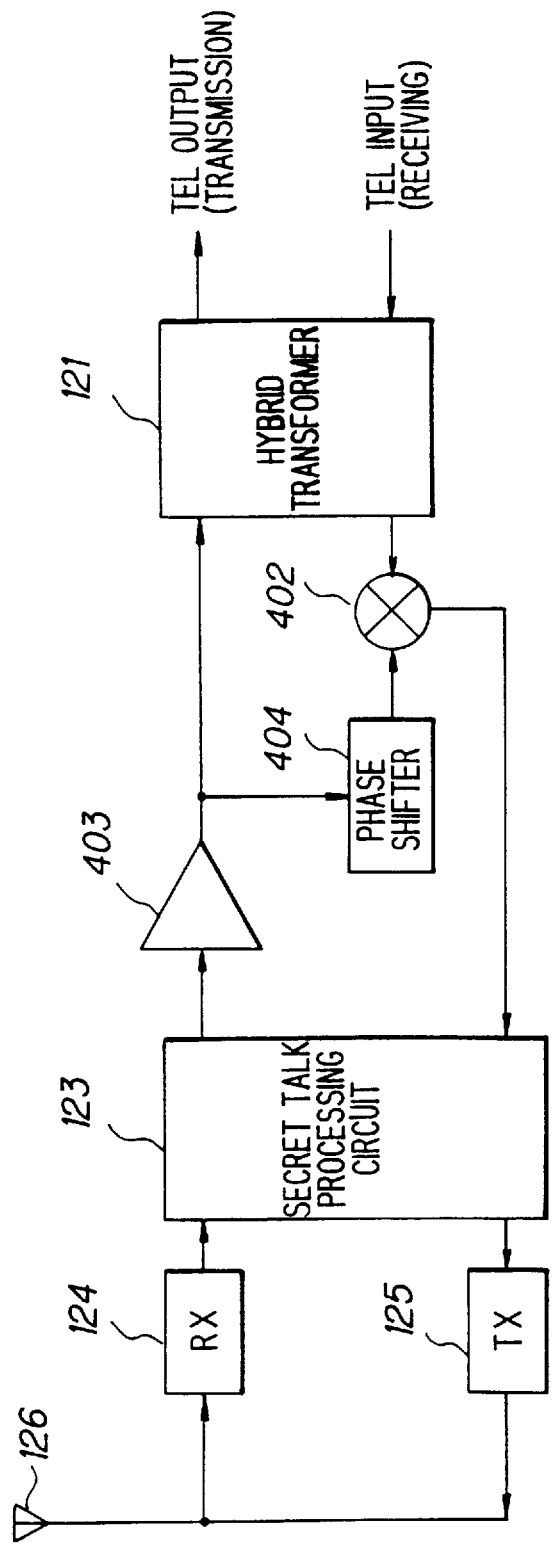
FIG. 4 is a block diagram of a digital cordless telephone (in the embodiment and a second example of conventional technology) based on the transformer system.

As in the conventional technology as shown in FIG. 4, the sidetone level reducing circuit 122 comprises phase shifter 404 and mixer 402, the output from the first secret talk processing circuit 123 is subjected to phase inversion in the phase shifter 404, the output from the phase shifter 404 is combined by the mixer 402 with the output from the transformer 121, and the combined output is supplied to the first secret talk processing circuit 123 to cancel the sidetone. With this feature, also a talker using the parent telephone set 120 can talk over the telephone line without any echo disturbance.

The slave telephone set 100 comprises, as main components, the slave telephone set microphone 101, sidetone supply circuit 102, delaying circuit (delaying circuit) 103, level reducing circuit 104, slave telephone set speaker 106, amplifier (AMP2) 113, and second secret talk processing circuit 110. The delay circuit 103 comprises operational amplifier 111, and detector 112. It should be noted that the first secret talk processing circuit 123 and second secret talk processing circuit 110 are provided with a secret talk processing section and a secret talk reproducing section respectively, each including an A/D convertor and a D/A convertor to execute digital secret talk processing such as, for instance, interleave.

Figure 2:
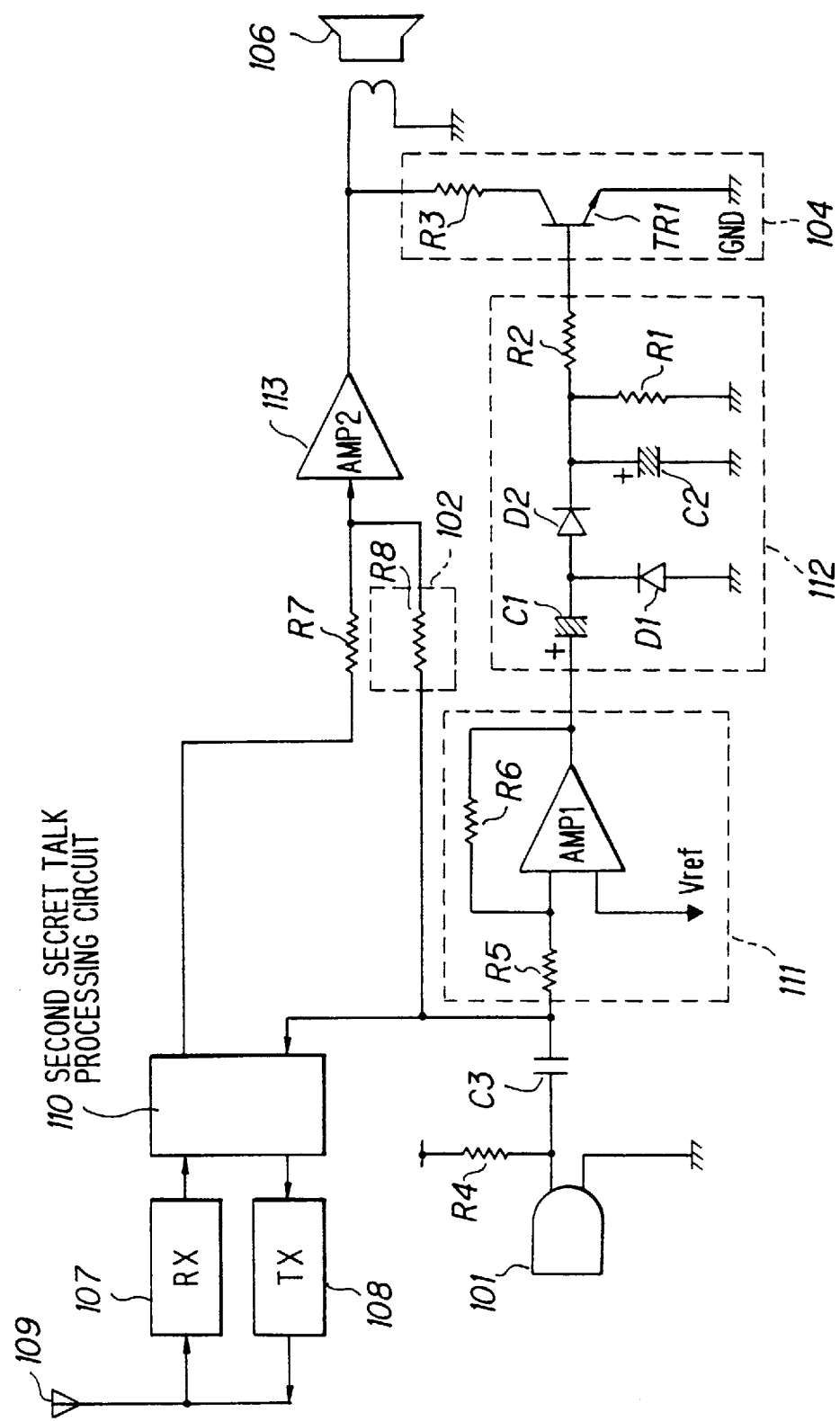
FIG. 2 is a circuit block diagram of the slave telephone set in the embodiment.
Figure 3:
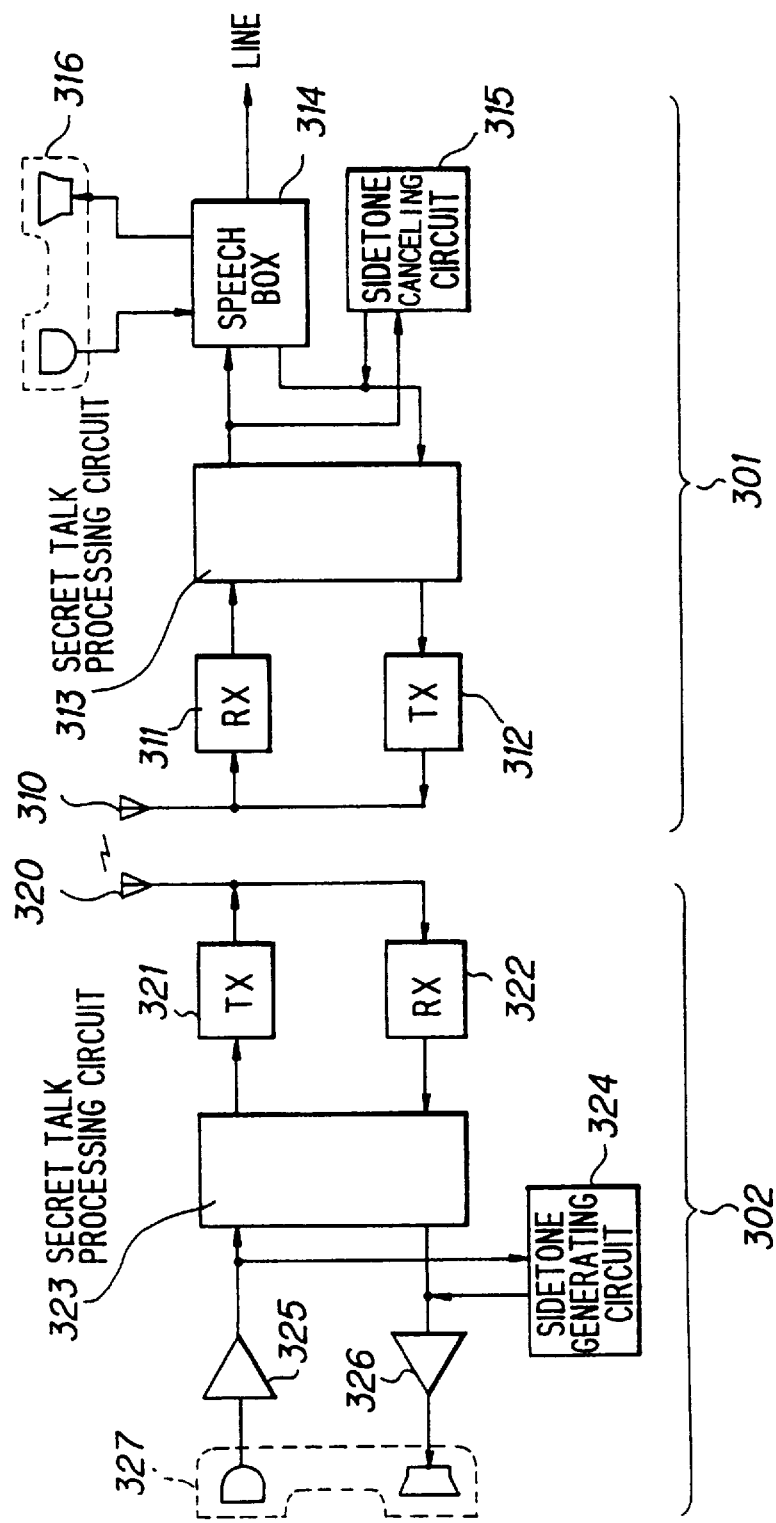
FIG. 3 is a block diagram of a cordless telephone (a first embodiment of conventional technology) based on a conventional type of speech network IC system.

FIG. 2 is a circuit block diagram of a slave telephone set in the present embodiment. The sidetone supply circuit 102 is realized by a resistor R8 which is an attenuating circuit, and is combined with a resistor R8 connected to an output terminal of the second secret talk processing circuit 110, thus the combined output being supplied to the amplifier 113.

Namely, an aural signal received through a slave telephone set antenna 109 and subjected to digital secret talk processing is combined with a sidetone which is a portion of an aural signal from the slave telephone set microphone 101, and the combined output is amplified and then supplied to the slave telephone set speaker 106. A talker using the slave telephone set 100 can hear a portion of an aural signal taken from the slave telephone set microphone 101 as a sidetone through the sidetone supply circuit 102 from the slave telephone set speaker 106. Hence, no echo thus talk not disturbance arises over the telephone line.

The delaying circuit 103 comprises operational amplifier 111 (AMP 1) and detector 112 (DET), and delays an aural signal from slave telephone set microphone 101 by a specified period of time. Namely, in the operational amplifier 111, an aural signal from the slave telephone set microphone 101 having a voltage level higher than a reference voltage Vref is outputted, and in detector 112 an active signal is outputted by delaying the output from operational amplifier 111 by the specified period of time.

The operational amplifier 111 comprises resistors R5, R6 and an operational amplifier AMP1, and the presence of an output is detected according to the reference voltage Vref. Also, the detector 112 comprises electrolytic capacitors C1 and C2, diodes D1 and D2, resistors R1 and R2, and a delay time is decided according to the capacity of the capacitors and a resistance value.

It should be noted that the reference voltage Vref may be set previously by a talker according to the volume of the talker's voice, or may be automatically set according to the volume of said voice. Also the specified period of time is previously set according to the time required for digital secret talk processing in the first secret talk processing circuit 123 and second secret talk processing circuit 110.

The level reducing circuit 104 comprises a resistor R3 and a transistor TR1, and reduces a level of output from the second secret talk processing circuit 110 (amplifier 113) according to the output from the delaying circuit 103. Namely, the output from the delaying circuit 103 is connected to a base electrode of transistor TR1, and the transistor TR1 turns ON/OFF connection between output from the sidetone generating circuit 102 and ground voltage (GND) according to the output. Namely, when the output from the delaying circuit 103 becomes active, the transistor TR1 is turned ON, and the level of signal supplied to the slave telephone set speaker 106 is reduced. It should be noted that its rate of reduction can be controlled by setting the value of resistor R3 or by making it variable.

Next, description is made, based on slave telephone set 100, explaining that in this embodiment, a talker using the slave telephone set 100 can talk over the telephone line without feeling disturbed due to echo. At first, an aural signal picked up by the slave telephone set microphone 101 is supplied to the second secret talk processing circuit 110, and also to the operational amplifier 111 and sidetone supply circuit 102. As described above, a portion of the aural signal supplied to the sidetone supply circuit 102 is delivered as a sidetone to the slave telephone set microphone 106, which makes it possible for a talker using the slave telephone set 100 to talk over the telephone line without any echo disturbance.

An aural signal supplied to the second secret talk processing circuit 110 is subjected to digital secret talk processing and then supplied, through a slave telephone set antenna 109 and a parent telephone set antenna 126, to the parent telephone set 120, where the aural signal is subjected to digital secret talk processing by the first secret talk processing circuit 121 and is delivered through the transformer 121 to a talker using the parent telephone set 120.

Furthermore, an aural signal supplied to the operational amplifier 111 having a voltage level exceeding the reference voltage Vref is amplified by and outputted from the operational amplifier 111. The amplified signal is supplied to detector 112, rectified by diodes D1 and D2, and electric charge is accumulated in the electrolytic capacitor C2. Because electric charge is accumulated in the electrolytic capacitor C2, the output level from the detector 112 reaches an active level, and at the same time a base voltage in the transistor TR1 goes up. When the voltage between the base emitters exceeds about 0.6 V, the transistor TR1 is turned ON, so that an output signal from the amplifier 113 is connected to the ground voltage GND, and thus the voltage level of the output signal is reduced.

The delay time in the detector 112 is previously set so that the time when a voltage level of the output signal drops is synchronized to the time when the aural signal from the slave telephone signal 100 returns as sidetone through the parent telephone set. With this delay, the level of the sidetone can be reduced, and the echo problem, which has not been solved by the conventional technology, can be solved.

As described above, in the radio transmitter/receiver according to the present embodiment, the level of sidetone accompanying delay due to digital secret talk processing can be determined by a constant rate without being affected by line loss or line impedance, so that, even in the transformer system in which countermeasures against sidetone has been difficult, it is possible to realize a radio transmitter/receiver provided with a telephone set which enables talk without an accompanying disturbing level of sidetone, and can respond to various line types and different line lengths.

Also in the present invention, appropriate countermeasures against sidetone accompanying time delay due to digital secret talk processing can be taken by setting the reference voltage Vref according to the volume of a talker's voice or by setting delay time in the detector 112 (DET) according to a time required for digital secret talk processing. Furthermore, by using a switch circuit TR1 such as a transistor element, a speaker circuit can be realized as an integrated circuit, and consequently, the size of the circuit can be minimized, and also the size of the radio transmitter/receiver can be reduced.

With the radio transmitter/receiver according to the present invention, in the parent telephone set, the level of sidetone transferred from a line through the transformer is reduced by a sidetone level reducing circuit. In the slave telephone set, an aural signal is delayed by a delaying circuit by a specified time set according to the time required for digital secret talk processing in the first secret talk processing circuit and second secret talk processing circuit. The level of output from the second secret talk processing circuit is also reduced by a level reducing circuit at a timing based on output from the delaying circuit, so that the level of sidetone accompanying delay due to digital secret talk processing in the second secret talk processing circuit of the slave telephone set and the first secret talk processing circuit of the parent telephone set, in other words the level of sidetone returning through the parent telephone set, can be reduced at a time when said sidetone reaches a speaker of the slave telephone set, and a level of the sidetone can be reduced by a constant rate without being affected by line loss or line impedance. Hence, even in the transformer system, it is possible to provide a radio transmitter/receiver which enables talk without accompanying echo by reducing the sidetone level and can respond to various line types and different line lengths.

With the radio transmitter/receiver according to the present invention, in the slave telephone set, an aural signal from a microphone of the slave telephone set is delayed by a delaying circuit by a specified time set according to a time required for digital secret talk processing for the aural signal. The level of output from a secret talk processing circuit is reduced at a time based on output from the delaying circuit, and for this reason, a level of sidetone accompanying delay due to digital secret talk processing for an aural signal, in other words sidetone returning through the parent telephone set, can be reduced at a time when the sidetone reaches a speaker of the slave telephone set and the level of the sidetone can be reduced by a constant rate without being affected by line loss or line impedance. Hence, even in the transformer system, it is possible to provide a radio transmitter/receiver which enables talk without accompanying echo by reducing the level of sidetone, and can respond to various line types and different line lengths.

Also with the radio transmitter/receiver according to the present invention, in the delaying circuit when the level of voltage of an aural signal from the slave telephone set microphone exceeds a specified reference voltage level, a signal having the specified voltage level is outputted from an operational amplifier, and the output from an operational amplifier is delayed by a detector by the specified period of time. Hence, it is possible to provide a radio transmitter/receiver which can accurately respond to sidetone accompanying a time delay due to digital secret talk processing by setting the level of the specified reference voltage according to the volume of a talker's voice or by setting the delay time by the delaying circuit to an appropriate value.

With the radio transmitter/receiver according to the present invention, a level reducing circuit is realized by a switch circuit such as a transistor element, and a connection between the output of the second secret talk processing circuit or secret talk processing circuit and ground is turned ON/OFF according to output from the delaying circuit. Hence, a speaker circuit can be realized as an integrated circuit, which makes it possible to provide a radio transmitter/receiver in which the size of the circuitry and, in turn, size of the radio transmitter/receiver itself, can be reduced.

Also with the radio transmitter/receiver according to the present invention, in the slave telephone set, an aural signal from a microphone in the slave telephone set is transferred through the sidetone transfer circuit to the slave telephone set speaker so that the voice of a talker using the slave telephone set is delivered as a sidetone to the talker. For this reason, the talker can hear a portion of an aural signal taken into the telephone set microphone as a sidetone, and talk without accompanying echo is enabled.

Furthermore with the radio transmitter/receiver, a sidetone level reducing circuit comprises a phase shifter and a mixer, the output from the first secret talk processing circuit is subjected to phase inversion by the phase shifter, the output from the phase shifter is combined by the mixer with the output from a transformer, and the combined output is supplied to the first secret talk processing circuit to cancel the sidetone, so that also a talker using the parent telephone set can talk over the telephone line without hearing any echo.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cordless telephone set having a parent telephone set and a slave telephone set and having a radio transmitter/receiver executing bidirectional communications between said parent telephone set and said slave telephone set by subjecting an aural signal to digital talk processing, comprising:

a transformer which is an interface with a line and/or a receiver;

a sidetone level reducing circuit for reducing a level of sidetone from said transformer;

a first talk processing circuit for executing digital talk processing for an aural signal from said transformer or an aural signal received through an antenna of said parent telephone set;

a second talk processing circuit for executing digital talk processing for an aural signal from a slave telephone set microphone or an aural signal received through a slave telephone set antenna;

a delaying circuit for delaying an aural signal from said telephone set microphone by a specified delay time; and a level reducing circuit for reducing a level of said aural signal from said telephone set microphone according to an output from said delaying circuit;

said specified delay time being set by said delaying circuit according to a time required for digital talk processing in said first talk processing circuit and said second talk processing circuit.

2. A cordless telephone set according to claim 1, wherein said transformer comprises a hybrid transformer.

3. A cordless telephone set according to claim 1, wherein said delaying circuit has an operational amplifier outputting a signal having a specified voltage level when a voltage level of said aural signal exceeds a specified reference voltage level and a delaying means for delaying the output signal from said operational amplifier by the specified delay time.

4. A cordless telephone set according to claim 1, wherein said level reducing circuit has a switch for controlling an ON/OFF connection between said aural signal from said telephone set microphone and a ground voltage according to an output from said delaying circuit.

5. A cordless telephone set according to claim 1, wherein said slave telephone set has a sidetone transfer circuit for transferring an aural signal from said slave telephone set microphone to a slave telephone set speaker.

6. A cordless telephone set according to claim 1, wherein said sidetone level reducing circuit comprises a phase shifter subjecting an output from said first talk processing circuit to phase inversion, and a mixer combining an output from said phase shifter with an output from said transformer, and supplying the combined output to said first talk processing circuit.

7. A cordless telephone set having a parent telephone set and a slave telephone set and having a radio transmitter/receiver executing bidirectional communications between said parent telephone set and said slave telephone set by subjecting an aural signal to digital talk processing, wherein said parent telephone set comprises:
 a transformer which is an interface with a line and/or a receiver;
 a sidetone level reducing circuit for reducing a level of sidetone from said transformer; and
 a first talk processing circuit for executing digital talk processing for an aural signal from said transformer or an aural signal received through an antenna of said parent telephone set;

and wherein said slave telephone set comprises:
 a second talk processing circuit for executing digital talk processing for an aural signal from a slave telephone set microphone or an aural signal received through a slave telephone set antenna;
 a delaying circuit for delaying an aural signal from said telephone set microphone by a specified delay time; and
 a level reducing circuit for reducing a level of output from said second talk processing circuit according to an output from said delaying circuit;
 said specified delay time being set by said delaying circuit according to a time required for digital talk processing in said first talk processing circuit and said second talk processing circuit.

8. A cordless telephone set according to claim 7, wherein said parent telephone set comprises a hybrid transformer.

9. A cordless telephone set according to claim 7, wherein said delaying circuit has an operational amplifier outputting a signal having a specified voltage level when a voltage level of an aural signal from said slave telephone set microphone exceeds a specified reference voltage level and a delaying means delays an output from said operational amplifier by the specified delay time.

10. A cordless telephone set according to claim 7, wherein said level reducing circuit has a switch for controlling an ON/OFF connection between an output from said second talk processing circuit or said talk processing circuit and a ground voltage according to an output from said delaying circuit.

11. A cordless telephone set according to claim 7, wherein said slave telephone set has a sidetone transfer circuit for transferring an aural signal from said slave telephone set microphone to a slave telephone set speaker.

12. A cordless telephone set according to claim 7, wherein said sidetone level reducing circuit comprises a phase shifter subjecting an output from said first talk processing circuit to phase inversion, and a mixer combining an output from said phase shifter with an output from said transformer, and supplying the combined output to said first talk processing circuit.

* * * * *